United States Patent
Yokomitsu et al.

(10) Patent No.: US 7,406,079 B2
(45) Date of Patent: Jul. 29, 2008

(54) REPEATER AND AN INTER-NETWORK REPEATING METHOD

(75) Inventors: Yasushi Yokomitsu, Chikushino (JP); Akio Yao, Fukuoka (JP); Toshiyuki Hamasaki, Fukuoka (JP); Hiroshi Konishi, Kasuga (JP); Masahiro Shigyo, Chikushi-gun (JP); Yuji Mitsunaga, Dazaifu (JP); Kiminori Washitani, Fukuoka (JP); Hideaki Nagao, Dazaifu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 812 days.

(21) Appl. No.: 10/827,371

(22) Filed: Apr. 20, 2004

(65) Prior Publication Data
US 2004/0218614 A1 Nov. 4, 2004

(30) Foreign Application Priority Data
Apr. 21, 2003 (JP) .............................. 2003-115568

(51) Int. Cl.
*H04L 12/28* (2006.01)
(52) U.S. Cl. ...................................... 370/392; 370/401
(58) Field of Classification Search .................... None
See application file for complete search history.

(56) References Cited

U.S. PATENT DOCUMENTS

| | | | | |
|---|---|---|---|---|
| 6,891,840 B2 * | 5/2005 | Okada | ......................... | 370/401 |
| 7,167,923 B2 * | 1/2007 | Lo | .............................. | 709/245 |
| 2002/0024959 A1 * | 2/2002 | Kong | ......................... | 370/401 |
| 2002/0024960 A1 * | 2/2002 | Tsuchiya et al. | ............ | 370/401 |
| 2002/0075844 A1 | 6/2002 | Hagen | | |
| 2003/0076830 A1 * | 4/2003 | Asano | ......................... | 370/392 |
| 2004/0042446 A1 * | 3/2004 | Koch et al. | .................. | 370/352 |

OTHER PUBLICATIONS

Written Opinion of International Search Report dated Oct. 18, 2004.
International Search Report dated Oct. 18, 2004.
P. Srisuresh, et al: "RFC 2663—IP Network Address Translator (NAT) Terminology and Considerations" IETF RFC, Aug. 1999, XP002204216, pp. 1-30.

(Continued)

*Primary Examiner*—Chau T. Nguyen
*Assistant Examiner*—Kenneth R Hartmann, II
(74) *Attorney, Agent, or Firm*—Dickinson Wright, PLLC

(57) ABSTRACT

The present invention provides a repeater which automatically closes a dynamically opened port in accordance with prior setting, the repeater including: a port mapping table where a global IP address and an external port number, or an external port number on the Internet is associated with a local IP address and an internal port number of a terminal connected to a LAN; a control unit which, receiving a communications packet to which an external port number is specified, converts the external port number to an internal port number based on the port mapping table and transfers the internal port number to the LAN; a timer unit which counts the unoccupied time of the port after transferring a communications packet to which an external port number is specified; and a port management unit which checks whether the registered machine is present on the LAN and in case it is absent, deletes registration concerning the external port number from the port mapping table.

11 Claims, 12 Drawing Sheets

OTHER PUBLICATIONS

T. Imaizumi, et al: "PANS : Public Access Network Station" Parallel Processing, 1999. Proceedings. 1999 International Workshops on Aizu-Wakamatsu, Japan Sep. 21-24, 1999, Los Alamitos, CA, USA, IEEE, US, Sep. 21, 1999, pp. 220-225, XP010356018.

M. Schmitz, et al: "WANIPConnection: 1 Service Template Versions 1.01 (Chapters 1 and 2)" UPNP Forum Standard, 'Online! Nov. 12, 2001, p. 1-33, XP002298367 Retrieved from the Internet: URL:http://www.upnp.Org/standardizeddcps/documents/UPnP_IGD_1.0.zip> 'retrieved on Sep. 28, 2004!.

* cited by examiner

FIG. 5

| OUTSIDE THE ROUTER | | INSIDE THE ROUTER | | | |
|---|---|---|---|---|---|
| EXTERNAL PORT NUMBER | EXTERNAL IP ADDRESS | INTERNAL PORT NUMBER | IP ADDRESS | HOST NAME | PRESET TIME |
| 80 | 232.0.0.2 | 8080 | 192.168.0.1 | MACHINE 1 | (10 MINUTES) |
| 2000 | | 80 | 192.168.0.3 | MACHINE 2 | 20 MINUTES |
| 2003 | | 101 | 192.168.0.3 | MACHINE 3 | 5 MINUTES |

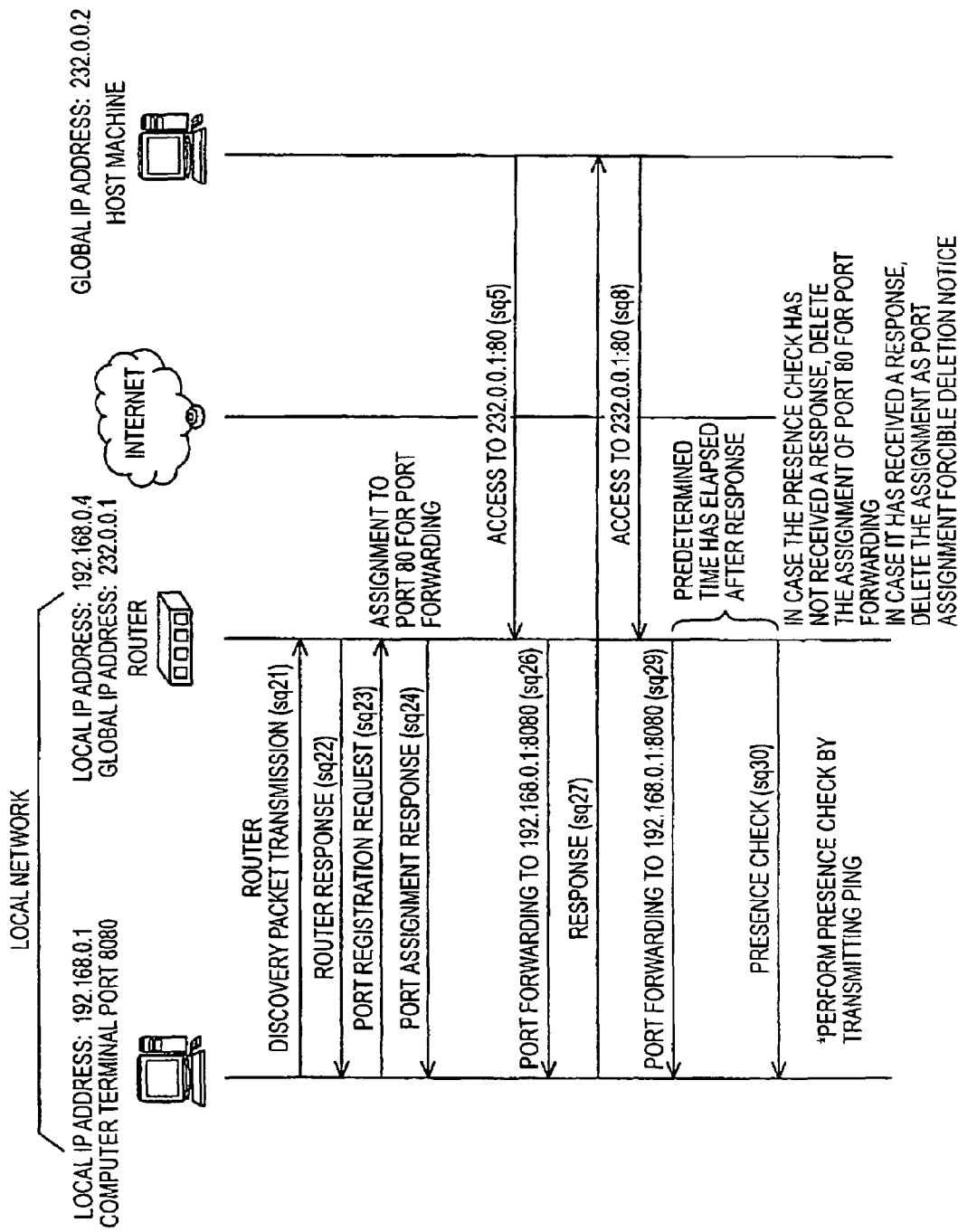

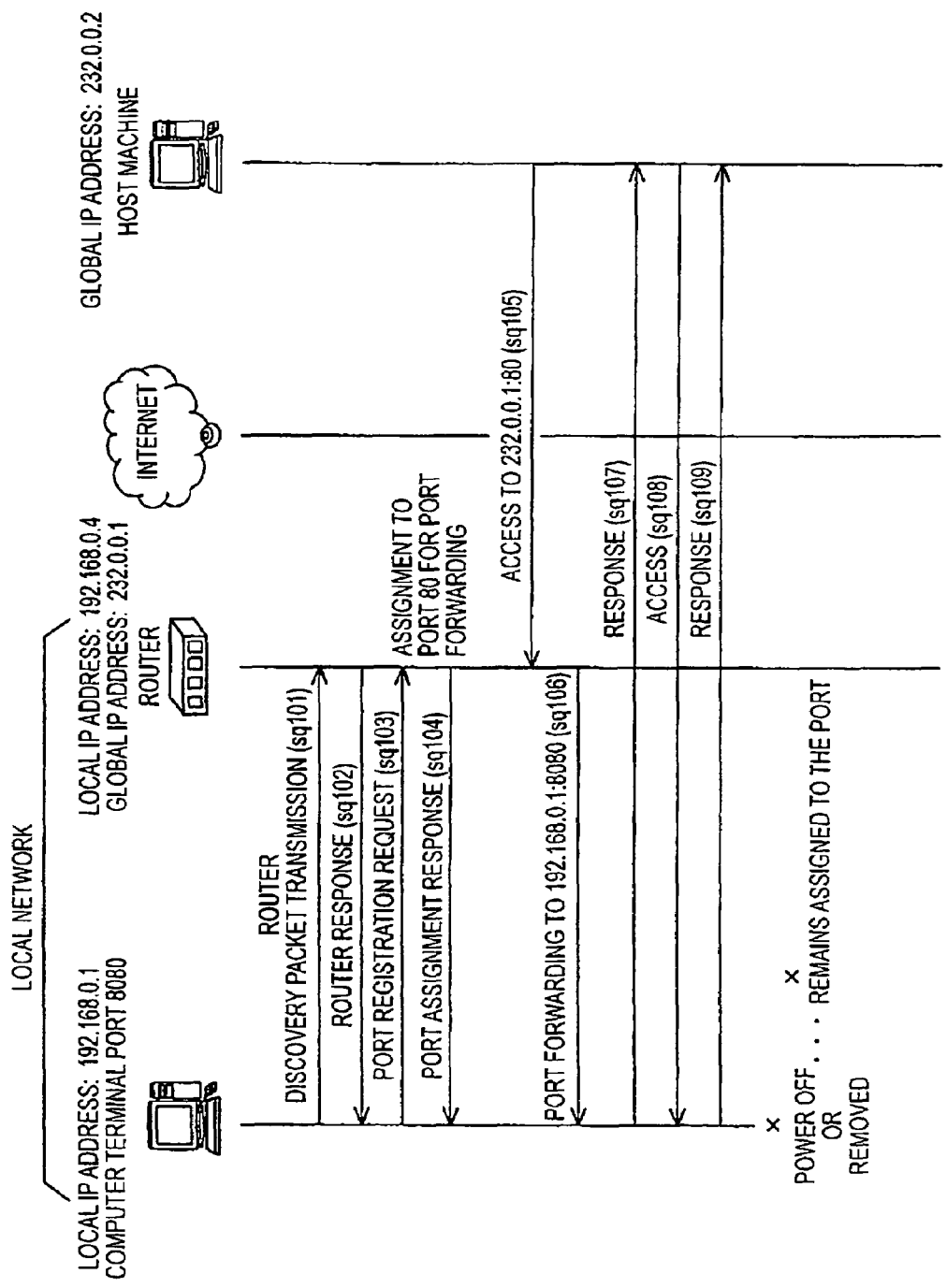

REPEATER AND AN INTER-NETWORK REPEATING METHOD

BACKGROUND OF THE INVENTION

1. Field of the Invention

The invention relates to a repeater such as a router and in particular to a repeater and an inter-network repeating method which perform dynamic port forwarding setting to open a port and automatically close the dynamically opened port.

2. Description of the Related Art

ADSL and CATV have been in widespread use in order to establish continuous connection to a wide area network such as the Internet, with remarkable diffusion of broadband routers. With the currently used IP protocol IPv4, the absolute number of global IP addresses (hereinafter referred to as external IP addresses) is insufficient so that the NAT (Network Address Translation) feature or port forwarding feature (static IP masquerade) is used to compensate for the shortage of external IP addresses. The NAT feature converts, in an access from a device on a LAN to the Internet, its local IP address (internal IP address; hereinafter referred to as the IP address) to an external IP address of a router on a WAN.

An access from the Internet to a specific device on the LAN is made available by using the port forwarding feature (static IP masquerade) of the router. To be more precise, a conversion table of port numbers and IP addresses is set to the router and the external IP address and external port number of the router is specified in an access from the Internet. In response to the access, the router converts the external IP address to an IP address in accordance with the preset conversion table. This conversion allows an access to a device on a LAN having the IP address.

The port forwarding feature and the NAT feature have allowed a related art router to ease exhaustion of external IP addresses and connect a plurality of user devices on a LAN and the Internet. In this practice, the user had to acquire the port number of the device and manually perform or modify its setting.

Such manual setting is cumbersome and insufficient in terms of utilization of ports. To cope with this problem, the UPnP Forum defined a standard for setting of dynamic port forwarding (port mapping) (refer to UPnP Standard, [online], [searched Jan. 13, 2003], Internet address: "http//:www.upnp.org/standardizeddcps/default.asp). Setting in accordance with this standard lets a subordinate terminal request the router open a port. The router registers the port if possible. In case the port cannot be used, the terminal requests a second time and repeats the procedure until the port is determined to be available. In the UPnP standard, a port can be assigned for an indefinite or definite period. Use of the definite assignment automatically deletes a dynamically set external port without the intervention of a router vendor. FIG. 12 is a sequence chart showing the procedure from port assignment to port cancellation in related art dynamic port forwarding.

As shown in FIG. 12, when Server A to which the user has set the internal port number "8080" on the LAN is connected to the outer having the external IP address "232.0.0.1" (IP address "192.168.0.4" assigned by the DHCP server), Server A transmits a DHCP discovery packet and the DHCP server assigns the IP address "192.168.0.1". Then Server A transmits a router discovery packet (sq 101) and the router responds thereto (sq 102). Receiving the discovery packet, Server A transmits a port registration request (sq 103) and the router assigns the external port number "80" in response (sq 104).

When a client terminal having the external IP address "232.0.0.2" connected to the Internet accesses Server A by using the address "http//:232.0.0.1:80" (sq 105), the router performs port forwarding to the address "http//:192.168.0.1:8080" (sq 106). Server A returns a response (sq 107), the client terminal makes an access for processing by Server A (sq 108), and Server A transmits a response ((sq 109). Then communications between the client terminal and Server A are ended. In case port assignment is based on an indefinite-period assignment request made by Server A, the port remains assigned to Server A when the communications are over.

As mentioned above, the related art port forwarding function by a router (static IP masquerade function) allows an access to a terminal in the LAN by using an external port number. This approach is cumbersome in that, each time the external port number is changed in accordance with the system change on the LAN side, the change in the IP number must be set manually.

For dynamic port forwarding by way of a standard from the UPnP Forum, in case port assignment is based on an indefinite-period assignment request made by the server or terminal, the port remains assigned to the serve or terminal when the communications are over. Thus, in case the application on the communicating terminal has terminated, the port remains assigned even when it is no longer used. This port could act as a security hole to allow an illegal access.

SUMMARY OF THE INVENTION

The invention aims at providing a repeater which automatically closes a dynamically opened port in accordance with prior setting.

In order to attain the object, the invention provides a repeater which passes on a communications packet between a first network and a second network, the repeater comprising: a port mapping table where a global IP address and an external port number on the first network are associated with the local IP address and the internal port number of a terminal connected to the second network; control means which, receiving a communications packet to which the external port number is specified, converts the external port number to the internal port number based on the port mapping table and transfers the internal port number to the second network; timer means which counts the unoccupied time of the port after transfer of a communications packet with the internal port number specified; and port management means which deletes registration concerning the external port number from the port mapping table when the unoccupied time of the port has reached a predetermined time.

This allows a dynamically opened port to be automatically closed in accordance with prior setting.

BRIEF DESCRIPTION OF THE DRAWINGS

FIG. 5 illustrates a port mapping table according to Embodiment 1 of the invention;

FIG. 11 illustrates a sequence from port assignment to deletion of port by way of presence check after access according to Embodiment 1 of the invention; and FIG. 12 is a sequence chart from port assignment to port cancellation according to the related art port forwarding.

DESCRIPTION OF THE PREFERRED EMBODIMENTS

Figure 1:
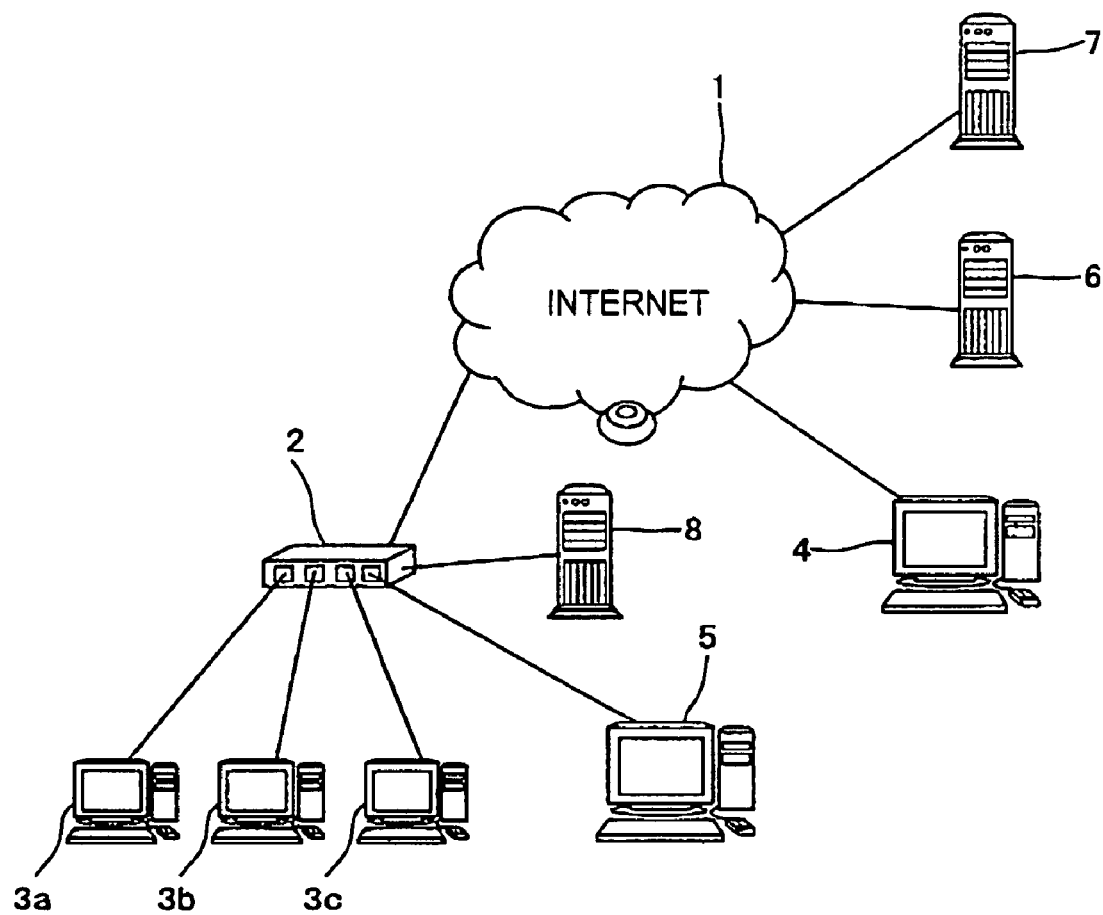
FIG. 1 is a block diagram of a network system which accesses a client terminal subordinate to a repeater according to Embodiment 1 of the invention.

Embodiments of the invention are described below referring to the drawings.

Embodiment 1

Figure 2:
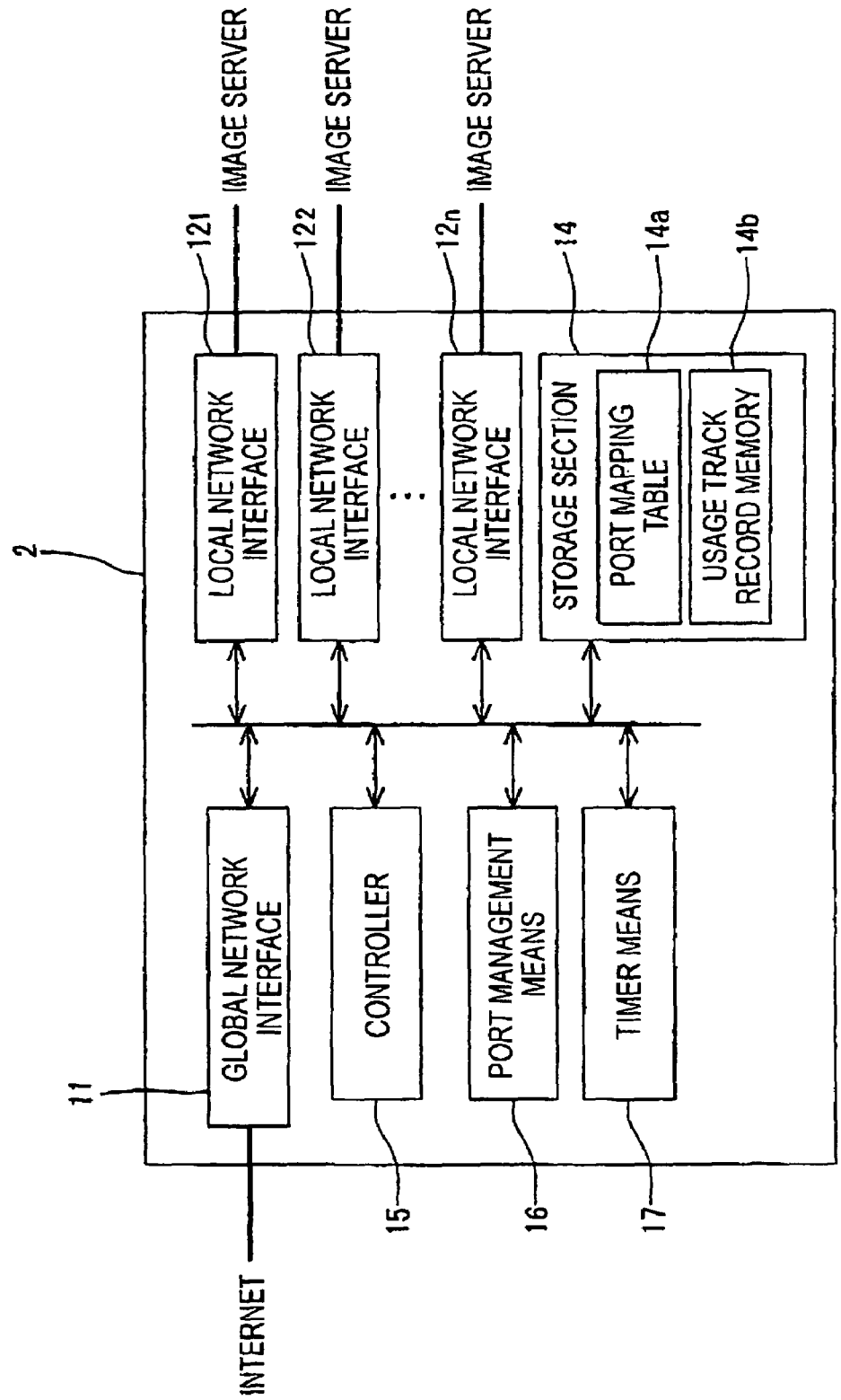
FIG. 2 is a block diagram of the repeater according to Embodiment 1 of the invention.
Figure 3:
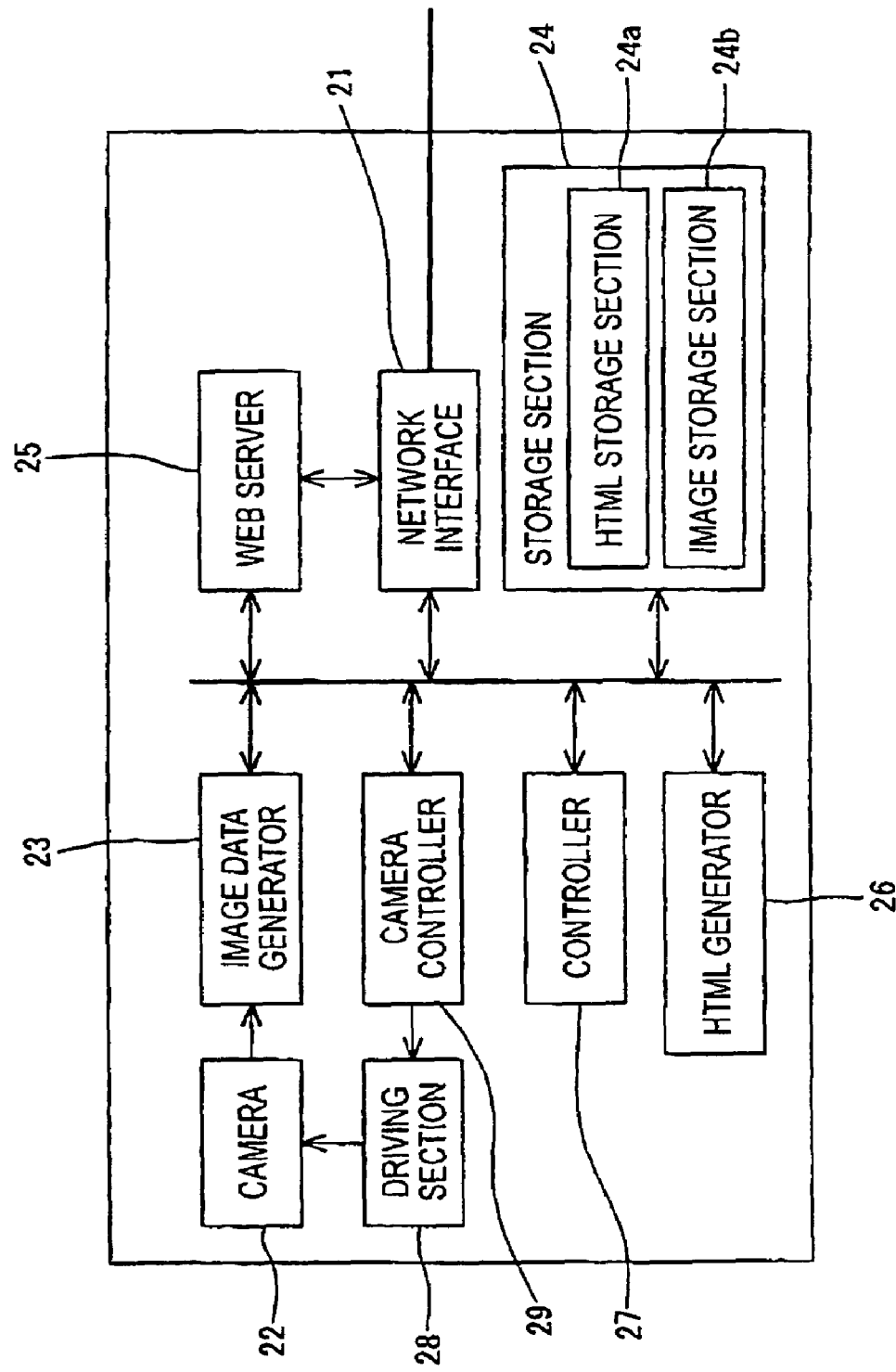
FIG. 3 is a block diagram of the client terminal according to Embodiment 1 of the invention.
Figure 4:
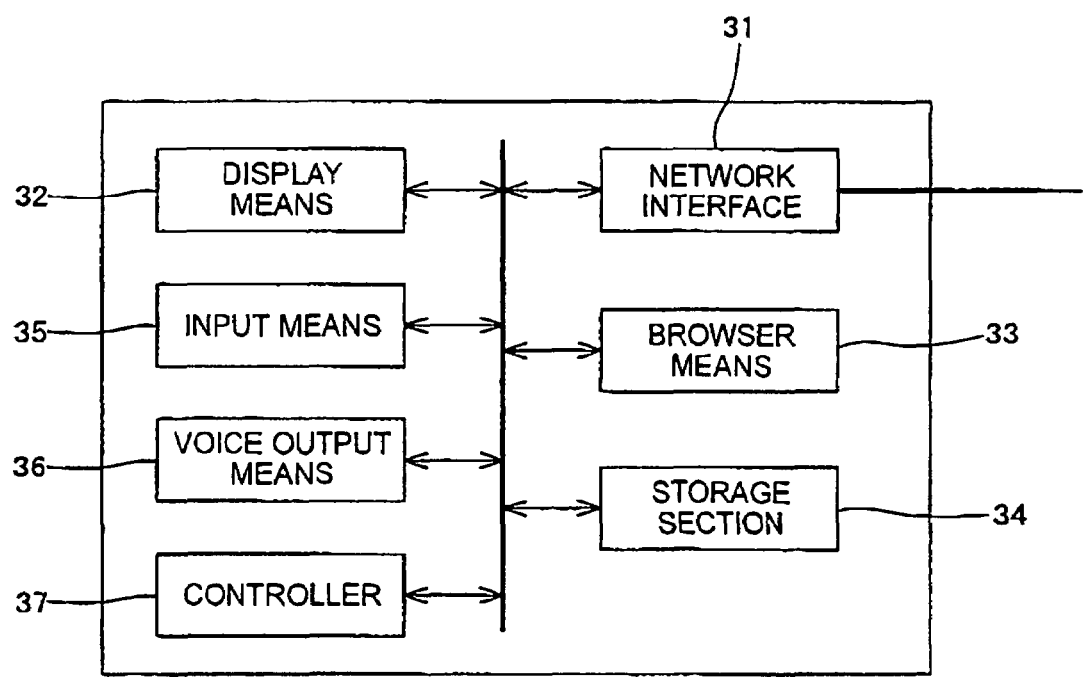
FIG. 4 is a block diagram of a server according to Embodiment 1 of the invention.
Figure 6:
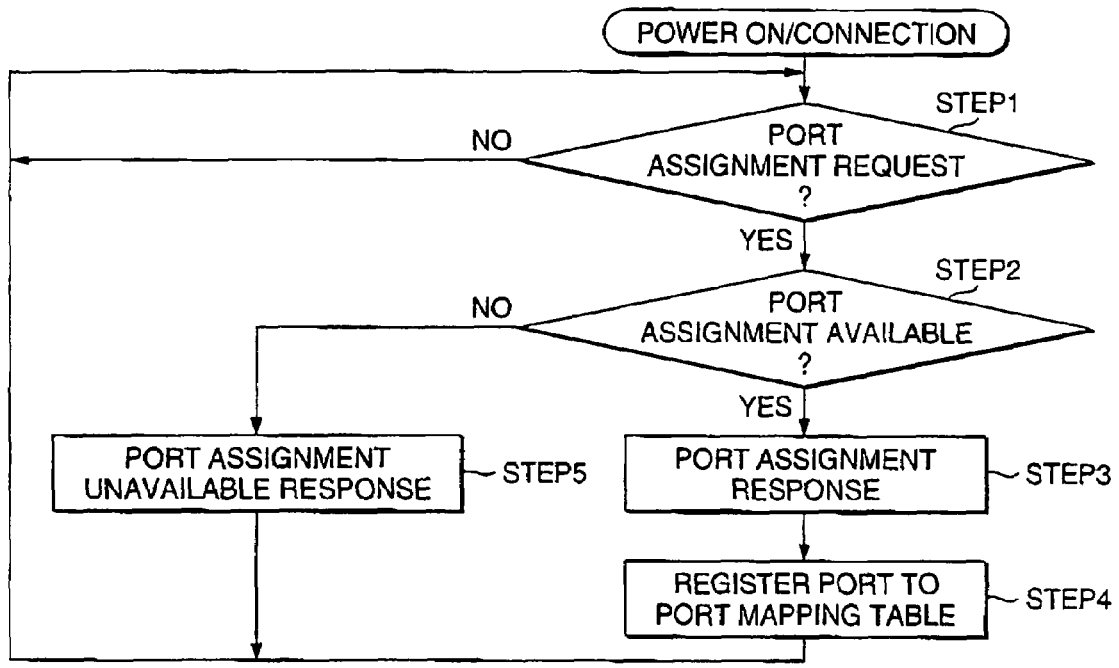
FIG. 6 is a flowchart of port assignment according to Embodiment 1 of the invention.
Figure 7:
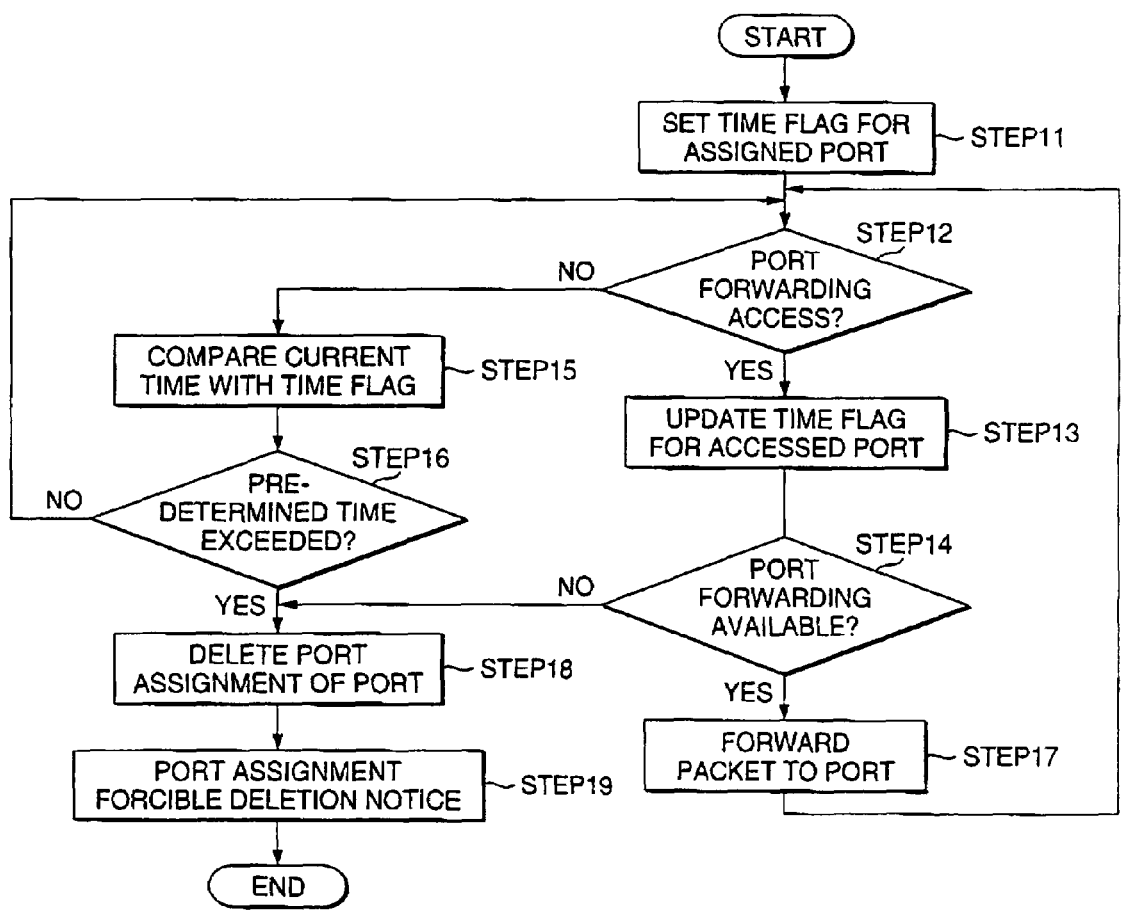
FIG. 7 is a flowchart of deleting port assignment by a timer according to Embodiment 1 of the invention.
Figure 8:
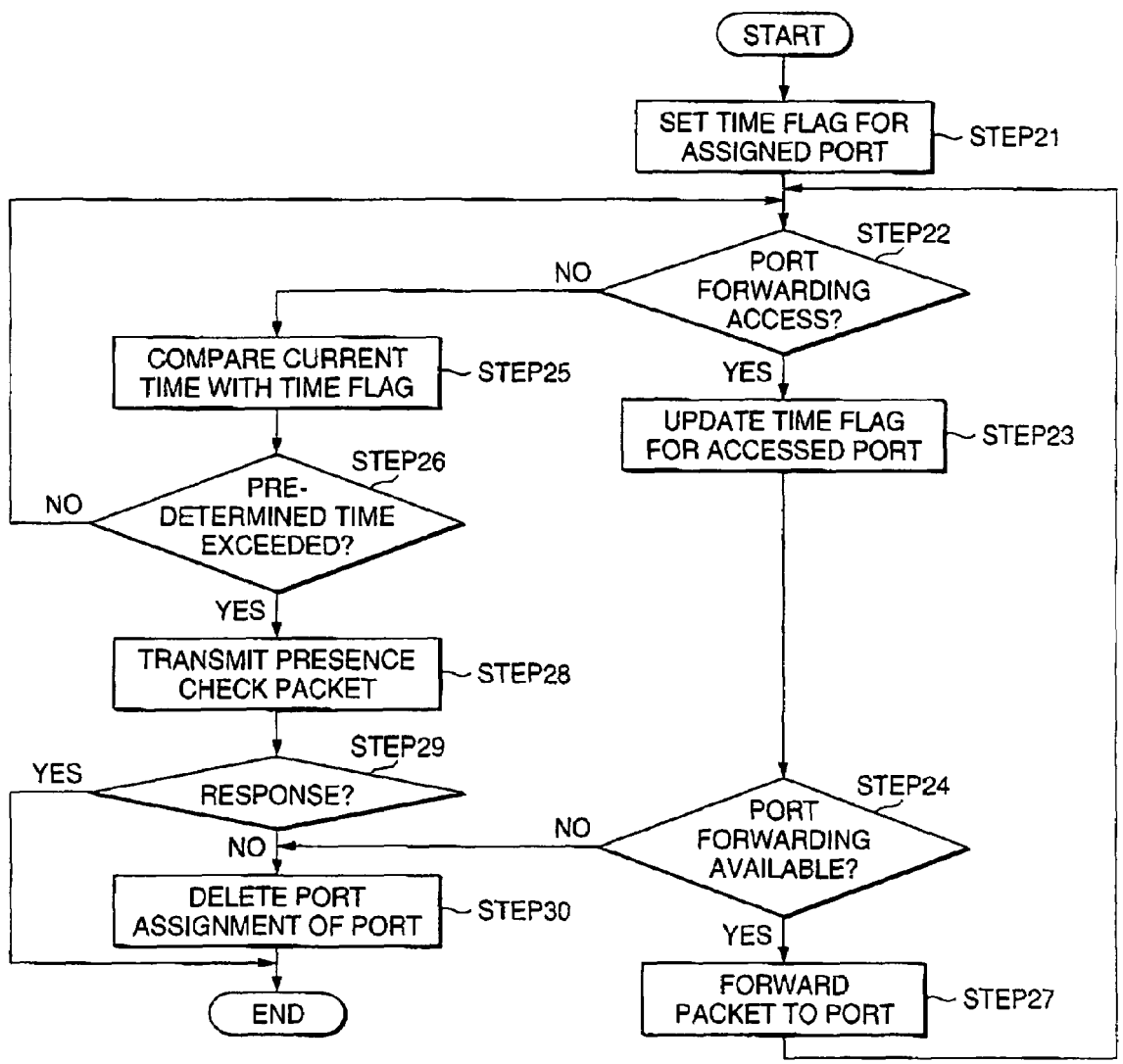
FIG. 8 is a flowchart of deleting port assignment by way of presence check after access according to Embodiment 1 of the invention.
Figure 9:
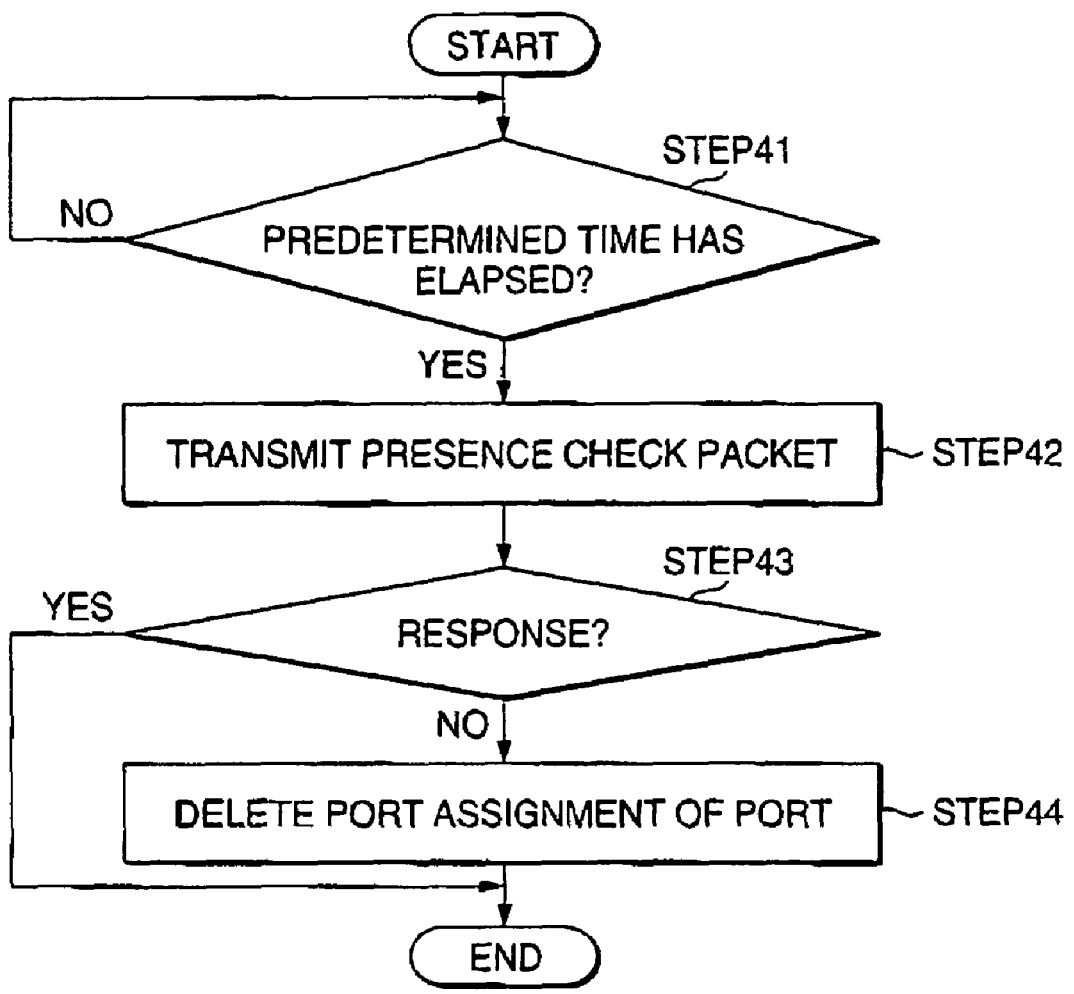
FIG. 9 is a flowchart of deleting port assignment by way of periodical presence check according to Embodiment 1 of the invention.
Figure 10:
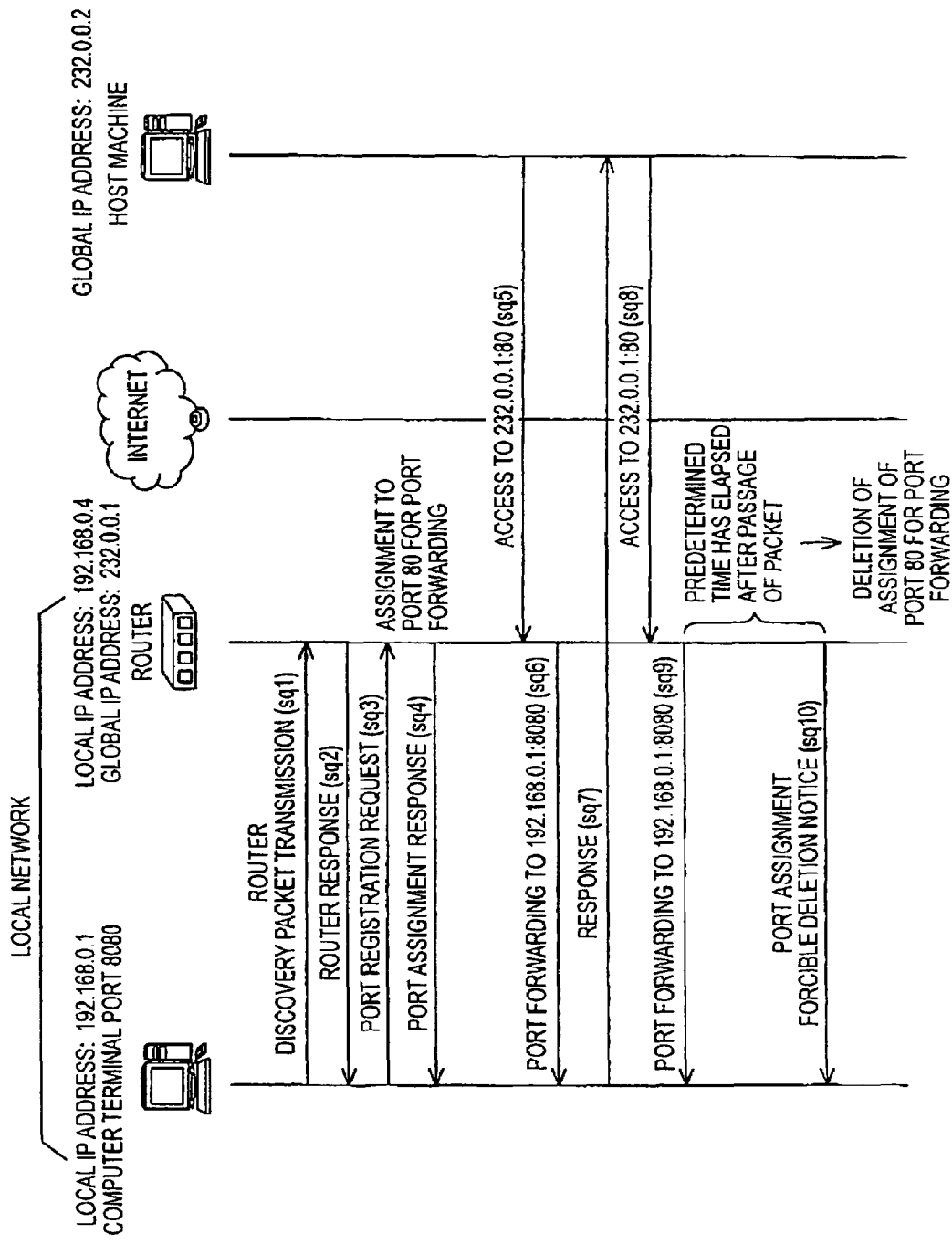
FIG. 10 illustrates a sequence from port assignment to deletion of port by a timer according to Embodiment 1 of the invention.

A repeater according to Embodiment 1 of the invention is described below. FIG. 1 is a block diagram of a network system which accesses a client terminal subordinate to a repeater according to Embodiment 1 of the invention. FIG. 2 is a block diagram of the repeater according to Embodiment 1 of the invention. FIG. 3 is a block diagram of the client terminal according to Embodiment 1 of the invention. FIG. 4 is a block diagram of a server according to Embodiment 1 of the invention. FIG. 5 illustrates a port mapping table according to Embodiment 1 of the invention. FIG. 6 is a flowchart of port assignment according to Embodiment 1 of the invention. FIG. 7 is a flowchart of deleting port assignment by a timer according to Embodiment 1 of the invention. FIG. 8 is a flowchart of deleting port assignment by way of presence check after access according to Embodiment 1 of the invention. FIG. 9 is a flowchart of deleting port assignment by way of periodical presence check according to Embodiment 1 of the invention. FIG. 10 illustrates a sequence from port assignment to deletion of port by a timer according to Embodiment 1 of the invention. FIG. 11 illustrates a sequence from port assignment to deletion of port by way of presence check after access according to Embodiment 1 of the invention.

In FIG. 1, a numeral 1 represents the Internet (a first network according to the invention) which is one of the wide area networks (WANs) communicating by using the TCP/IP, 2 a router (a repeater according to the invention) which has an interface connectable to the Internet 1 and which comprises a plurality of ports on a local area network (a second network according to the invention; hereinafter referred to as the LAN) to perform routing to subordinate terminals, for example image servers 3a, 3b, 3c mentioned later, in particular, to perform port forwarding of an IP packet in accordance with the UPnP Standard, and 3a, 3b, 3c image servers. A numeral 4 represents a terminal which is connected to the Internet 1 to access the image servers 3a, 3b, 3c, 5 a computer terminal in which a browser function is incorporated, 6 a DNS (Domain Name System) server which responds with a global IP address (an external IP address of the invention; hereinafter referred to as the external IP address) to an access using a host name, 7 a web server connected to the Internet 1. A numeral 8 represents a DHCP (Dynamic Host Configuration Protocol) server which assigns an IP address to each of the image servers 3a, 3b, 3c out of the predetermined local IP addresses (internal IP addresses according to the invention; hereinafter referred to as the IP addresses) in a LAN. The DHCP server may be mounted on the router 2.

In Embodiment 1, when the image servers 3a, 3b, 3c are connected to the router 2, each server makes a request for assignment of an external port to the router 2 and registers available external port numbers. For example, when one of the image servers 3a, 3b, 3c, for example the image server 3a makes a request for assignment of an external port number, the router 2 assigns a predetermined external port number, for example "80". In this practice, the Internet 1 can recognize the image server 3a having the port number "80". On an access using the port number "80" from the Internet 1, the port forwarding function of the router 2 forwards communications packets to the image server 3a as one of the image servers 3a, 3b, 3c without fail. A port number registered to the router 2 includes an external port number used by the Internet 1 and an internal port number used by a LAN. In case an external port number to be dynamically assigned to the router 2 in accordance with the UPnP Standard is already in use, a request is issued to assign another port number.

Similarly, the router 2 makes a request for assignment of external ports, for example "2000" and "2001" to the remaining image servers 3b, 3c. This allows connection to the image servers 3a, 3b, 3c when the user makes an access from the terminal 4 to the image servers 3a, 3b, 3c by using the external port number.

The internal configuration of the router 2 according to Embodiment 1 is described referring to FIG. 2. In FIG. 2, a numeral 11 represents a global network interface of the image servers 3a, 3b, 3c to the Internet 1, and $12_1, 12_2, \ldots, 12_n$ local network interfaces connected to the image servers 3a, 3b, 3c respectively. In case a plurality of global IP addresses are used, a plurality of global network interfaces 11 are provided.

A numeral 14 represents a storage section which memorizes control programs and various data, 14a a port mapping table for assigning port mapping information, and 14b a usage track record memory for setting a time for closing a port. The port mapping table 14a associates an external IP address and an external port number to an IP address and an internal port number. When only one global network interface is used, an external IP address need not be associated.

A numeral 15 represents a controller which works as function implementation means for reading a control program into a Central Processing Unit (CPU) to perform each function. The controller 15 controls the entire system as well as performs address conversion in accordance with a port mapping table 14a and performs port forwarding of a received packet. A numeral 16 represents port management means which assigns port numbers for the image servers 3a, 3b, 3c and deletes the assigned port numbers, and 17 timer means for counting the time which has elapsed since the packet passed.

The router 2 according to Embodiment 1 closes a port which remains open by way of counting time in response to a request for indefinite-period assignment of an external port number by the image servers 3a, 3b, 3c or computer terminal 5, so as not to let the open external port act as a security hole. A first method therefor is to close an external port when a predetermined time or time set by the user has elapsed after an access to the external port. Timer means 17 counts the time to detect the timing for closing the port. A second method therefor is: the controller 15 for managing communications transmits a ping command or an ARP command to a destination of the forwarding of the access to the external port to perform presence check and closes the port when absence is confirmed. A third method therefor is: the port management means 16 periodically transmits a ping command or an ARP command to a destination of the forwarding of the access to the external port to check presence of a terminal in the LAN and closes the port when it is confirmed that the terminal is absent. A fourth method therefor is to receive a port assignment request and open the port, and close the port when a request for renewal of lease is absent as the DHCP lease period has elapsed. Details will be given later.

Next, the internal configuration of the image servers 3a, 3b, 3c will be described referring to FIG. 3. In FIG. 3, a numeral 21 represents the network interface of the image servers 3a, 3b, 3c to the Internet 1. The network interface 21 communicates a request made by the browser on the terminal 4 to the image servers 3a, 3b, 3c and transmits to the Internet 1 data described in a markup language such as the HTML in order to display a web page from the image servers 3a, 3b, 3c and an image shot with a camera 22. A numeral 22 represents a camera, and 23 an image data generator for processing an R, G, b signals or a complementary color signal as a picture signal from a CCD or a CMOS image pick-up device provided on the camera 22 to generate a luminance signal Y and a color-difference signal Cr, Cb to compress the processed signal in the JPEG format, MPEG format or other compression formats.

A numeral 24 represents a storage section which memorizes a control program and various data, 24a an HTML storage section for storing a plurality of files where display instructions and ink information are described in a markup language such as HTML, and 24b an image storage section for storing the image data compressed by the image data generator 23.

A numeral 25 represents a web server for communicating with the Internet 1 by using the protocol TCP/IP, and 26 an HTML generator for fetching, on an access to the web server 25 from the browser on the terminal 4, a file described in HTML from the storage section for the browser, dynamically generating HTML again depending on the situation, and transmitting the resulting file to the browser. A numeral 27 represents a controller which works as function implementation means for reading a control program into a Central Processing Unit (CPU) to perform each function. A numeral 28 represents a driving section including a motor for performing panning/tilting operation of the camera 22, and 29 a camera controller for driving the driving section 28. The controller 27 processes a request made by a browser and operates the HTML generator 26 to generate a file for a web page, fetches an image data to transmit to the browser from the storage section, or specifies a mode to the camera controller 29 to operate the camera controller 29.

The internal configuration of the terminal 4 will be described referring to FIG. 4. A numeral 31 is a network interface of the terminal 4 to the Internet 1. The network interface 31 communicates a request for an image to the image servers 3a, 3b, 3c and receives from the Internet 1 text data described in a markup language such as the HTML or image data to display a web page. A numeral 32 represents display means for showing data on a display, and 33 browser means for displaying a received web page byway of the display means 32 and requesting an image by using a control button and an icon displayed on a screen by way of GUI.

A numeral 34 represents a storage section which memorizes a control program and various data, 35 input means such as a keyboard and a mouse and 36 voice output means for regenerating voice data. The voice output means 36 may be plug-in software received via the Internet 1. A numeral 37 represents a controller which works as function implementation means for reading a control program into a Central Processing Unit (CPU) to perform each function.

The operation of setting of dynamic port forwarding by way of the UPnP Forum on the router 2 according to Embodiment 1 is described below referring to FIG. 6. When the image servers 3a, 3b, 3c are connected, the power is turned ON, or an application has started running on the computer terminal 5, once a port assignment request is received from the image servers 3a, 3b, 3c or computer terminal 5, the port management means 16 of the router 2 assigns a port and registers it to the port mapping table 14a.

The controller 15 of the router 2 awaits reception of a port assignment request packet and checks for a port assignment request (step 1). In case there is no port assignment request, the controller 15 awaits another port assignment request In case there is a port assignment request, the controller 15 checks whether port assignment is available (step 2). In case port assignment is available, the controller 15 assigns a port in response (step 3) and registers the port to the port mapping table 14a (step 4). In case port assignment is unavailable, the controller 15 issues a port assignment unavailable response (step 5) and returns to step 1 where the controller 15 awaits reception of a port assignment request packet.

An internal port number and an internal IP address to be registered to the port mapping table 14a together with an external port number are described in a port assignment packet. The internal port number and the internal IP address may be fetched from the TCP/IP header area in a port assignment request.

To the port mapping table 14a are registered the internal port number in a LAN and the external port number on the Internet as well as the IP address of the image servers 3a, 3b, 3c, a host name, and a preset time to close a port after the last access. The IP address is supplied by the DHCP server 8 after the image servers 3a, 3b, 3c has transmitted a DHCP discovery packet to the DHCP server 8. The preset time may be a time interval until a packet is transmitted in order to check presence of the image servers 3a, 3b, 3c. Further, it is possible to register a time interval between transmissions of ping or ARP for periodical presence check.

FIG. 5 shows an example of the port mapping table 14a. In FIG. 5, when the image server 3a having the host name "Machine 1" is connected to the LAN, the DHCP server 8 assigns the IP address "192.168.0.1" and the router 2 conforming to the UPnP Standard assigns the external port number "80". The internal port number "8080" is an internal port number used by the image server 3a to perform port assignment request for port forwarding. The preset time "10 minutes" is a default which is a time from when the last packet passed to when the port is closed.

Similarly, to the host name "Machine 2" are registered the external port number "2000" assigned by the router 2, the internal port number "80" and the IP address "192.168.0.3" assigned by the DHCP server 8, and the preset time "20 minutes" is specified. To the host name "Machine 3" are registered the external port number "2003", the internal port number "101" and the IP address "192.168.0.3", and the preset time "5 minutes" is specified. Relationship between the host names "Machine 2" and "Machine 3" assumes a case where they have the same IP address and, for example, a plurality of browser applications (such as network explorer) are started on the computer terminal 5 in FIG. 1 and the each running browser has made a port assignment request. In case a plurality of browser applications are started on the computer terminal 5, the browsers are assigned separate port numbers for external communications ("80" and "101" in FIG. 5) In this way, the external ports of the router 2 according to Embodiment 1 registered by the image servers 3a, 3b, 3c and computer terminal 5 are closed when the preset time has elapsed.

The operation of the port closure processing by the timer means 17 after port assignment to the image servers 3a, 3b, 3c will be described referring to FIG. 7. This processing closes a port when a predetermined time has elapsed after the last access. As shown in FIG. 7, the port management means 16 sets a time flag for setting the countdown time to the port which has been assigned (step 11). Then the timer means 17 starts counting the predetermined time. Next, whether a port forwarding access has been made is checked (step 12). In case it is determined that an access has been made in step 12, the time flag for the port is updated (step 13). In case it is determined that an access has not been made in step S12, the current time is compared with the time of the time flag (step 15) and whether the current time exceeds the predetermined time (step 16). In case it does not exceed the predetermined time, execution returns to step 12. Otherwise, execution proceeds to step 13. The time flag is updated in step 13 in case an access is made before a predetermined time has elapsed because the processes of steps 15 and 16 are performed.

In step 13, the time flag is updated and whether port forwarding is available is checked (step 14). In case it is available, the packet is forwarded to this port (step 17) and execution returns to step 12. In case port forwarding is unavailable in step 14 or a predetermined time has been exceeded in step 16, the port number of the port in question is deleted from the port mapping table 14a (step 18). Then, the router 2 transmits a port assignment forcible deletion notice to the image servers 3a, 3b, 3c (step 19) to terminate the processing. In case port forwarding is unavailable in step 14, execution may proceed to step 18 only in case port forwarding is found unavailable in a plurality of times running. In case port forwarding is found only once, execution returns to step 12.

The predetermined time counted by the timer means 17 is closely related to the actual utilization state of the user. It is thus preferable to set a time to accommodate the actual utilization state of the user to close a port, instead of counting a predetermined time. In this case, the controller 15 records the utilization history per image server 3a, 3b or 3c (per user), that is, the maximum time in the past history from when a port is opened to when it is closed, and uses the value of 110 per cent the maximum time as a closure time. Whether a server is used is determined by monitoring the presence of port opening requests or number of passing packets. The user may arbitrarily set an optimum time.

While a port is closed when a predetermined time has elapsed after the last port forwarding access is made from the Internet to an external port in the foregoing example, the port may be closed considering the last communications packet from a registered external port number to the Internet together with the last port forwarding access from the external port.

In this way, the router 2 according to Embodiment 1 comprises the timer means 17 for automatically closing a dynamically opened port conforming to the UPnP Standard, so that the router 2 can close the port when a predetermined time has elapsed after the port is opened. Moreover, the user can set an optimum time which is a preferable time to the user. The maximum time in the past use record is stored so as to accommodate the utilization history from opening to closing of a port. Thus, a port remains open despite the utilization period by setting a longer time than the previous utilization time for a next request.

The port closure processing made by way of presence check after the image servers 3a, 3b, 3c are assigned ports will be described referring to FIG. 6. This processing closes a port when it is confirmed that the image servers 3a, 3b, 3c are absent in a LAN. As shown in FIG. 8, the port management means 16 sets a time flag to the port which has been assigned (step 21). Then the timer means 17 starts counting the predetermined time. Next, whether a port forwarding access has been made is checked (step 22). In case it is determined that an access has been made in step 22, the time flag is updated (step 23). In case it is determined that an access has not been made in step S12, the current time is compared with the time of the time flag (step 25) and whether the current time exceeds the predetermined time (step 26). In case it does not exceed the predetermined time, execution returns to step 22. Otherwise, the port management means 16 transmits a presence check command such as a ping command or an ARP command (step 28) and checks whether a response is received (step 29). The time flag is updated in step 23 in case an access is made before a predetermined time has elapsed because the processes of steps 25 and 26 are performed.

The ping command which performs the presence check is a network command used to check communications between terminals and also check whether transmission/reception of a data packet is successful. A terminal receiving this command executes the same command to transmit an ICMP message. By receiving an ICMP message, the communications and presence of the distant terminal can be checked.

The ARP (Address Resolution Protocol) is a protocol used to obtain a MAC address from an IP address. In an environment such as MS-DOS, use of an ARP command can check whether the ARP cache table storing a MAC address has been properly set. When an ARP packet containing an IP address from which a MAC address is to be obtained is transmitted to a LAN, a terminal having the IP address responds, and the MAC address of the machine is obtained from the IP address. The ARP packet is also effective for a device mounting a terminal which does not respond to a ping command (firewall-mounted terminal).

In step 23, the time flag is updated and whether port forwarding is available is checked (step 24). In case port forwarding is available, the packet is forwarded to this port (step 24), then execution returns to step 22. In case port forwarding is unavailable in step 24 or in case a response is not made in step 29, the port number of the port is deleted from the port mapping table 14a (step 30) and the processing is terminated. In case a response is made in step 29, the processing is terminated. In case port forwarding is unavailable in step 24, execution may proceed to step 30 only in case port forwarding is found unavailable in a plurality of times running. In case port forwarding is found only once, execution returns to step 22.

The port closure processing periodically made by the router 2 by way of a presence check packet after the image servers 3a, 3b, 3c are assigned ports will be described referring to FIG. 9. As shown in FIG. 9, the timer means 17 periodically counts a predetermined time interval between transmissions of ping or ARP. The count is made until the predetermined time has elapsed. On a countout (step 41), the router 2 transmits a presence check command such as a ping command or an ARP command (step 42) and checks whether a response is received (step 43).

In case a response is not made in step 43, the port number of the port is deleted from the port mapping table 14a (step 44) and the processing is terminated. In case a response is made in step 43, the processing is terminated.

In this way, a presence check command such as a ping command or an ARP command is transmitted in predetermined time intervals such as 10 minutes to check the presence of a terminal. It is thus possible to check whether the port is used irrespective of an access via a network. It is possible to close the port without fail on an unexpected error or even when the terminal is powered off or an application is not successfully terminated with the port left open due to an accident. Unlike the two methods mentioned above, a port is closed as required while the timer means 17 is still counting the time.

The sequence will be described where Application A (for example a browser application) on the computer terminal 5 as a local server in a LAN makes an access to the web server 7 as a global server connected to the Internet 1 and the timer means 17 deletes the assigned port. As shown in FIG. 10, when the compute terminal 5 is started, a DHCP packet is transmitted to receive a response from the DHCP server 8 and the IP address "192.168.0.1" is assigned. The computer terminal 5 may avid using the DHCP server 8 and the user may manually assign the IP address "192.168.0.1" in a static way. To Application A which is started on the computer terminal 5 is assigned the port number "8080" on the computer terminal 5.

Application A transmits a router discovery packet (sq 1) and the router 2 issues a response (sq 2). Receiving the response, the application 5a transmits a port registration request (sq 3) and the router 2 makes a port assignment response. To the port registration request are associated the external port number "80" of the router 2 and the port number ""8080" and IP address "192.168.0.1" used by Application A. The port numbers and the IP address are recorded in association in the router as well.

Application B which receives a communications start packet from a device on the Internet 1 is typically a server application, for example a web server application. When connection is established from the web server 7 having the global IP address on the Internet "232.0.0.2" to Application B on the computer terminal 5 under the router 2, access is made by using "http232.0.0.1:80" (sq 5). The router 2 forwards the packet to the address "http://:192.186.0.1:8080" in accordance with the forwarding rule (sq 6). Receiving the forwarded packet, Application B returns a response packet to the web server 7 (sq 7). After that, in case the computer terminal 5 has accidentally disappeared from the Internet 1, even when a request packet is forwarded to the computer terminal 5 (sq 9) following an access from the web server 7 (sq 8), a response packet is not transmitted, which means the last communications using the external port "80".

Each time a packet passes through a registered port, the router 2 updates the timer means 17 and continues port forwarding. When a packet has passed in sq 9, the timer means 17 is no longer updated thus a time-out event takes place. On a time-out event without an incoming packet after the elapse of a predetermined time, the router 2 transmits a port assignment forcible deletion notice to the image server 3a (sq 10) and deletes the port number "80" from the port mapping table 14a.

Similarly, The sequence will be described where Application B (for example a web server application) on the computer terminal 5 makes an access from the web server 7 connected to the Internet 1 and the router 2 deletes the assigned port by way of presence check of the computer terminal 5 and Application B. The sequences sq 21 through 30 described below are basically the same as sq 1 through sq 10 used for processing on the timer means 17.

When the compute terminal 5 is started, a DHCP packet is transmitted to receive a response from the DHCP server 8 and the IP address "192.168.0.1" is assigned. The computer terminal 5 may avid using the DHCP server 8 and the user may manually assign the IP address "192.168.0.1" in a static way. To the application 5a which is started on the computer terminal 5 is assigned the port number "8080" on the computer terminal 5.

Application B transmits a router discovery packet (sq 21) and the router 2 issues a response (sq 22). Receiving the response, the application B transmits a port registration request (sq 23) and the router 2 makes a port assignment response sq 24). To the port registration request are associated the external port number "80" of the router 2 and the port number "8080" and IP address "192.168.0.1" used by Application B. The port numbers and the IP address are recorded in association in the router as well.

When connection is established from the web server 7 having the global IP address on the Internet "232.0.0.2" to Application B on the computer terminal 5 under the router 2, access is made by using "http232.0.0.1:80" (sq 25). The router 2 forwards the packet to the address "http://:192.186.0.1:8080" in accordance with the forwarding rule (sq 26). Receiving the forwarded packet, Application B returns a response packet to the web server 7 (sq 27). After that, in case the computer terminal 5 has accidentally disappeared from the Internet 1 due to power failure for example, even when a request packet is forwarded to the computer terminal 5 (sq 29) following an access from the web server 7 (sq 28), a response packet is not transmitted, which means the last communications using the external port "80".

When a response packet passes in sq 29, the router 2 counts on the timer means 17 the time until the predetermined time elapses. In case a next packet terminates within this time interval, the router updates the port and continues port forwarding. In case no packets are terminated within the predetermined time interval, the router 2 makes presence check of Application B or computer terminal 5 (sq 30).

In case a presence check packet has not received a response, the router 2 deletes data items related to the external port number "80" from the port mapping table 14a. In case a presence check packet has not received a response, the router 2 transmits a port assignment forcible deletion notice to the image server 3a (sq 11) and deletes data items related to the external port number "80" from the port mapping table 14a.

A presence check command such as a ping command or an ARP command is transmitted to check the presence of Application B or computer terminal 5. It is thus possible to close the port without fail on an unexpected error or even when the terminal is powered off or an application is not successfully terminated with the port left open due to an accident. This prevents the port from being left open until the time-out event takes place on the timer means.

Finally, although not illustrated, the case is described where a port assignment request is received, the port is opened, and the port is closed without receiving a request for renewal of the DHCP lease thereafter. The router 2 preferably comprises the DHCP server function.

In this embodiment, the router 2 mounts a DHCP server section (not shown) instead of the DHCP server 8. The router 2 assigns the IP addresses to the terminals including the image servers 3a, 3b, 3c in a LAN and the computer terminal 5 as well as uses the DHCP function to check that these terminals are absent in the LAN based on the presence/absence of a lease renewal request by a terminal on expiration of the DHCP lease period. Then the port is closed.

While the lease period may be set according to the protocol for DHCP, it is specified to check whether to renew the lease before the lease period runs out. This embodiment uses the specification and determines that a terminal is absent in the LAN based on the fact that the IP address is not updated on expiration of the DHCP lease period.

On expiration of the DHCP lease period, the DHCP server section of the router 2 inquires the terminal about whether to renew the DHCP lease. In case a lease renewal request is not made, the port management means 16 searches through the port mapping table 14a and deletes the port number in question to close the port quite easily by using the DHCP function of the router 2.

CROSS REFERENCE TO RELATED APPLICATION

This application is based upon and claims the benefit of priority of Japanese Patent Application No 2003-115568 filed on Apr. 21, 2003, the contents of which are incorporated herein by reference in its entirety.

What is claimed is:

1. A repeater which passes on a communications packet between a first network and a second network, the repeater comprising:
    a port number setting section which sets an external port number on the first network for a terminal connected to the second network, in response to an access from the terminal;
    a port mapping table where the set external port number is stored so as to be associated with an internal IP address and an internal port number of the terminal connected to the second network;
    a controller, which, receiving a communications packet to which the external port number is specified, converts the external port number to the internal port number based on the port mapping table and transfers the communication packet to the second network using the internal port number;
    a timer, which counts an unoccupied time of the external port number by starting to count the external port number is stored in the port mapping table; and
    a port manager, which, when the unoccupied time of the external port has reached a predetermined time, automatically deletes registration of the external port number that is elapsed in the predetermined time from the port mapping table.

2. The repeater according to claim 1, wherein the predetermined time can be set by an access from a terminal connected to the second network.

3. The repeater according to claim 1, wherein the port manager monitors the port open time, records the longest time and sets a time equal to or above the longest time as a threshold value of the unoccupied time.

4. The repeater according to claim 1, wherein the registration of the external port number is an internal IP address and internal port number that corresponds to the external port number.

5. A repeater which passes on a communications packet between a first network and a second network, the repeater comprising:
    a port number setting section which sets an external port number on the first network for a terminal connected to the second network, in response to an access from the terminal;
    a port mapping table where the set external port number on the first network is stored so as to be associated with an internal IP address and an internal port number of the terminal connected to the second network;
    a controller, which, receiving a communications packet to which the external port number is specified, converts the external port number to the internal port number based on the port mapping table and transfers the communication packet to the second network using the internal port number;
    a timer, which counts an unoccupied time of said external port by starting to count after the external port number is stored in the port mapping table; and
    a port manager, which, determining that a communications packet has not been received for a predetermined time, transmits a presence check packet to the terminal connected to the second network and which, receiving no response, automatically deletes a registration of the external port number that is elapsed in the predetermined time in the port mapping table.

6. A repeater which passes on a communications packet between a first network and a second network, said repeater comprising:
    a port number setting section which sets an external port number on the first network for a terminal connected to the second network, in response to an access from the terminal;
    a port mapping table where the set external port number on said first network is stored so as to be associated with an internal IP address and an internal port number of the terminal connected to said second network;
    a controller, which, receiving a communications packet to which the external port number is specified, converts the external port number to the internal port number based on the port mapping table and transfers the communication packet to the second network using the internal port number;
    a timer, which counts the time for periodically transmitting a presence check packet to the terminal connected to the second network; and
    a port manager, which transmits a presence check packet to the terminal connected to the second network at the time counted by the timer and which, receiving no response, automatically deletes registration of the external port number that is elapsed in the predetermined time from said port mapping table.

7. The repeater according to any one of claims 1, 5, or 6, wherein the repeater is a router which performs dynamic port forwarding of an IP packet in accordance with the UPnP Standard.

8. An inter-network repeating method which passes on a communications packet between a first network and a second network, the method comprising the steps of:
    determining that there is an access from a terminal connected to the second network to a main device, setting an external port number on the first network that corresponds to the terminal;
    creating a port mapping table where the set external port number on the first network is stored so as to be associated with an internal IP address and an internal port number of the terminal connected to the second network;
    receiving a communications packet to which the external port number is specified;
    converting the external port number to the internal port number based on the port mapping table;
    transferring the internal port number to the second network;
    counting an unoccupied time of the port after transfer of a communications packet with the internal port number to which is converted from the external port; and
    automatically deleting registration of the external port number from the port mapping table when the unoccupied time of the port has reached a predetermined time.

9. The repeater according to claim 8, wherein the registration of the external port number is an internal IP address and internal port number that corresponds to the external port number.

10. An inter-network repeating method which passes on a communications packet between a first network and a second network, the method comprising steps of:

determining that there is an access from a terminal connected to the second network to a main device, setting an external port number on the first network that corresponds to the terminal;

creating a port mapping table where the external port number on the first network is stored so as to be associated with an internal IP address and an internal port number of the terminal connected to the second network;

receiving a communications packet to which the external port number is specified, converting the external port number to the internal port number based on the port mapping table and transferring the internal port number to the second network;

counting the unoccupied time of the port after transfer of a communications packet with the internal port number to which is converted from the external port; and determining that a communications packet has not been received for a predetermined time, transmitting a presence check packet to the terminal connected to the second network and, receiving no response, automatically deleting registration of the external port number that is elapsed in the predetermined time in the port mapping table.

11. An inter-network repeating method which passes on a communications packet between a first network and a second network, the method comprising steps of:

determining that there is an access from a terminal connected to the second network to a main device, setting an external port number on the first network that corresponds to the terminal;

creating a port mapping table where the set external port number on said first network is stored so as to be associated with an internal IP address and an internal port number of the terminal connected to the second network;

receiving a communications packet to which the external port number is specified, converting the external port number to the internal port number based on the port mapping table and transferring the internal port number to the second network;

counting the time for periodically transmitting a presence check packet to the terminal connected to the second network; and transmitting a presence check packet to the terminal connected to the second network at the time counted and, receiving no response, automatically deleting a registration of the external port number that is elapsed in the predetermined time from the port mapping table.

* * * * *